(12) United States Patent
Pulskamp et al.

(10) Patent No.: US 8,546,288 B2
(45) Date of Patent: Oct. 1, 2013

(54) SUBSTRATE SELECTION FOR A CATALYST

(75) Inventors: Andrea Pulskamp, Plymouth, MI (US);
James Waldecker, Plymouth, MI (US);
Shinichi Hirano, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 13/396,660

(22) Filed: Feb. 15, 2012

(65) Prior Publication Data

US 2013/0210614 A1  Aug. 15, 2013

(51) Int. Cl.
*B01J 21/00* (2006.01)
*B01J 31/00* (2006.01)

(52) U.S. Cl.
USPC .......................................... 502/100; 502/104

(58) Field of Classification Search
None
See application file for complete search history.

(56) References Cited

U.S. PATENT DOCUMENTS

| | | | |
|---|---|---|---|
| 4,490,219 A | 12/1984 | Bindra et al. | |
| 4,816,359 A | 3/1989 | Nagele et al. | |
| 2007/0082256 A1 | 4/2007 | Debe et al. | |
| 2009/0117257 A1 | 5/2009 | Monnier et al. | |

FOREIGN PATENT DOCUMENTS

| | | |
|---|---|---|
| EP | 0600718 A2 | 6/1994 |
| JP | 5251096 A | 9/1993 |
| JP | 2006147371 A | 6/2006 |
| KR | 100792152 B1 | 1/2008 |
| WO | 2009080522 A1 | 7/2009 |

OTHER PUBLICATIONS

Adzic, R. R., et al, Platinum Monolayer Fuel Cell Electrocatalysts, Topics of Catalysis Journal, vol. 46, Nos. 3-4, Dec. 2007, pp. 1, Abstract Only.

Beard, K.D., et al., Preparatio of Highly Dispersed PEM Fuel Cell Catalysts Using Electroless Deposition Methods, Applied Catalysis B: Environmental, vol. 72, Issues 3-4, Mar. 30, 2007, pp. 1-2, Abstract Only.

Caillard, A., et al., Effect of Nafion and Platinum Content in a Catalyst Layer Processed in a Radio Frequency Helicon Plasma System, Journal of Physics D: Applied Physics, vol. 42, No. 4, 2009, pp. 1-3, Abstract Only.

(Continued)

*Primary Examiner* — Bijay Saha
(74) *Attorney, Agent, or Firm* — Damian Porcari; Brooks Kushman P.C.

(57) ABSTRACT

In one embodiment, a method of forming a catalyst/substrate construction includes: identifying a catalyst having a specific activity, determining a surface area factor for supporting the catalyst based on the specific activity of the catalyst; selecting a substrate having the surface area factor; and applying the substrate to the catalyst to form the catalyst/substrate construction. In certain instances, the surface area factor may be determined according to the following equation:

$$SA_{support}(cm^2_{support}/cm^2_{planar}) = \frac{[\text{``Baseline''}(A/mg_{Pt}) \times \text{Mass Activity } IF \times \text{Loading } (mg_{Pt}/cm^2)]}{[\text{Specific Activity } (\mu A/cm^2) \times 0.000001 \ (A/\mu A)]}$$

wherein the term "Baseline" refers to mass activity of 100 A per gram of platinum (Pt) for a comparative catalyst 5 nm Pt nano-particles dispersed on a carbon black support, the term "Mass Activity IF" refers to the activity required to achieve a high current density performance target of 1.5 A/cm² at 0.67 V, at a platinum loading of 0.1 mg Pt/cm².

18 Claims, 3 Drawing Sheets

(56) References Cited

OTHER PUBLICATIONS

Ekstrom, Henrik, Evaluating Cathode Catalysts in the Polymer Electrolyte Fuel Cell, KTH Chemical Science and Engineering, Doctorial Thesis, Stockholm, 2007, pp. 1-68.

Gasteiger, Hubert, A., et al., Activity Benchmarks and Requirements for Pt, Pt-alloy, and non-Pt Oxygen Reduction Catalysts for PEMFCs, Applied Catalysts B: Environmental, vol. 56, Issues 1-2, Mar. 10, 2005, pp. 1-27.

Jiang, Junhua, et al., Thickness Effects of a Carbon-supported Platinum Catalyst Layer on the Electrochemical Reduction of Oxygen in Sulfuric Acid Solution, Journal of Electroanalytical Chemicstry, vol. 577, Issue 1, Mar. 15, 2005, pp. 1. Abstract Only.

Moreau, Francois, et al., Influence of the Surface Area of the Support on the Activity of Gold Catalysts for CO Oxidation, Catalysis Today, vol. 122, Issues 3-4, Apr. 30, 2007, pp. 1-2, Abstract Only.

Roller, Justin, Low Platinum Electrodes for Proton Exchange Fuel Cells Manufactures by Reactive Spray Deposition Technology, 2009, pp. 1-4, Abstract Only.

Siavcheva, E., et al., Effect of Sputtering Parameters on Surface Morphology and Catalytic Efficiency of Thin Platinum Films, Applied Surface Science, vol. 255, Issues 13-14, Apr. 15, 2009, pp. 1, Abstract Only.

Wieckowski, Andrzej, Fuel Cell Catalysis: A Surface Science Approach (The Wiley Series on Electrocatalysis and Electrochemistry), pp. 1-6, Abstract Only, 2009.

Mayrhofer, K.J.J., Measurement of Oxygen reduction Activities Via The Rotating Disc Electrode Method: From Pt Model Surfaces to Carbon-supported High Surface Area Catalysts, Electrochimica Acta 53, 2008, pp. 1-8.

SUBSTRATE SELECTION FOR A CATALYST

TECHNICAL FIELD

One or more embodiments of the present invention relate to substrate selection for a catalyst.

BACKGROUND

Reliability and working lifetime are important considerations in commercializing fuel cell (FC) technologies for automotive applications. As important as catalyst durability is the catalyst activity in leading to successful commercialization of fuel cell vehicles. Development of a highly active and durable catalyst for PEMFC applications remains a key challenge.

SUMMARY

In one embodiment, a method of forming a catalyst/substrate construction includes: identifying a catalyst having a specific activity; determining a surface area factor for supporting the catalyst, particularly a bulk-like catalyst, based on the specific activity of the catalyst; selecting a substrate having the surface area factor; and applying the substrate to the catalyst to form the catalyst/substrate construction.

In another embodiment, the determining step includes determining the surface area factor as a reciprocal function to the specific activity of the catalyst. In yet another embodiment, the determining step includes determining the surface area factor based on the specific activity of the catalyst according to the following equation:

$$SA_{support}(cm^2_{support}/cm^2_{planar}) = \frac{[\text{"Baseline"}(A/mg_{Pt}) \times \text{Mass Activity } IF \times \text{Loading }(mg_{Pt}/cm^2)]}{[\text{Specific Activity }(\mu A/cm^2) \times 0.000001 \, (A/\mu A)]}$$

In yet another embodiment, the method further includes calculating a targeted surface area corresponding to the surface area factor. In certain instances, the step of calculating includes calculating the targeted surface area as a positive function of the surface area factor. In certain other instances, the step of calculating further includes calculating the targeted surface area as a function of the surface area factor and at least one of three parameters: a material density of the substrate, a thickness of the catalyst layer, and a catalyst utilization rate.

In yet another embodiment, the step of calculating includes calculating the targeted surface area from the surface area factor according to equation:

$$SA(m^2/g) = \frac{52 \, cm^2/cm^2_{planar}}{\delta_{CCL} \, (cm)} \times \frac{1}{\rho_{support} \, (g/cm^3)} \times \frac{1 \, m^2}{10000 \, cm^2} \times \frac{1}{u}$$

In yet another embodiment, the method further includes selecting the substrate if the targeted surface area is no greater than an observed surface area of the substrate.

In yet another embodiment, the method further includes ignoring the substrate if the targeted surface area of the substrate is greater than an observed surface area of the substrate and repeating the steps of determining, pre-selecting and calculating.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Bulk-like catalysts for oxygen reduction reaction (ORR) in a proton exchange membrane fuel cell (PEMFC) cathode have been reported to be associated with high area-specific activity and higher durability. Desirable catalyst-supporting substrates should be able to obtain higher dispersion of catalytic sites, to facilitate transport of water, gas, electrons, heat, and protons (to/from the cathode catalyst), and ideally to positively influence (interact) with the active specie to achieve the highest area-specific activity with the lowest amount of catalyst. Bulk-like, thin film catalysts are believed to be more durable than their nanoparticle counterparts at least partly due to their relatively increased surface coordination amongst platinum (Pt) atoms, thereby alleviating unwanted oxygen adsorption and/or Pt dissolving.

One or more embodiments of the present invention relate to the discovery that certain surface area factor values can be determined and employed as a factor of substrate selection suitable for supporting a given catalyst. The given catalyst may be a bulk-like, thin film catalyst, or a bulk-like catalyst in a core-shell configuration. For the purpose of illustration, the following description will be directed to bulk-like, thin film catalyst. It is appreciated that the present invention, in one or more embodiments, may be equally applicable to bulk-like catalyst in other morphologies, such as bulk-like catalysts in a core-shell configuration.

Figure 1A:
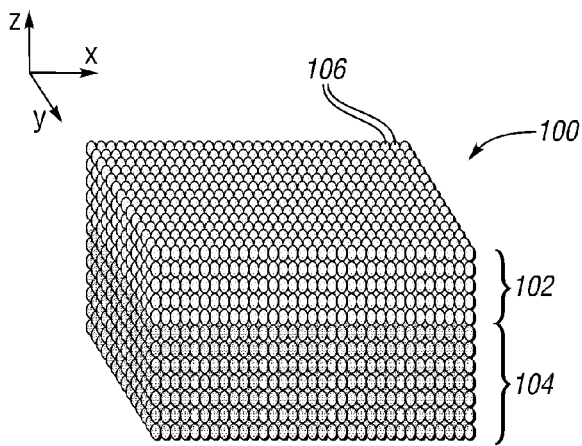
FIGS. 1A, 1B and 1C each depict a perspective view of a bulk-like catalyst having thin film morphology according to one or more embodiments of the present invention.
Figure 1B:
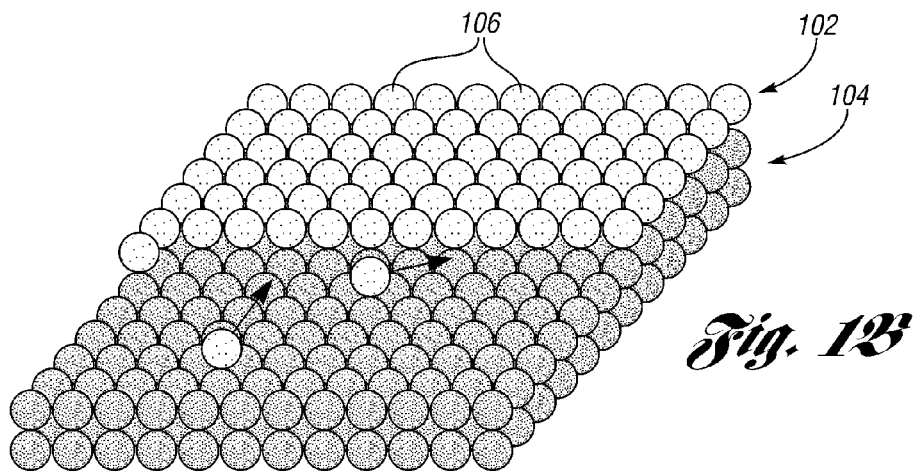
Figure 1C:
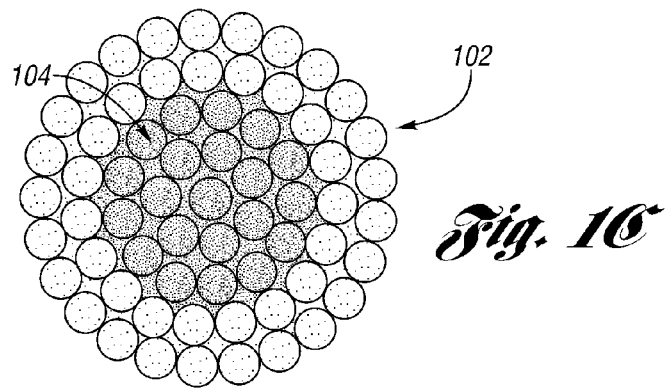

In one or more embodiments, and as depicted in FIGS. 1A and 1B, a bulk-like, thin film catalyst may take the morphology of a two-dimensional extensive thin film 102, contacting a substrate 104 with the latter being in a supporting configuration. The bulk-like, thin film catalyst 102 may itself include two or more sub-layers of the catalyst atoms 106. The 2-D extensive catalyst 102 is presented in a bulk-like configuration such that the catalytic metals behave, relative to conventional nano-particles, more like bulk metals. In this bulk-like configuration, the 2-D extensive catalyst 102 is presented as being x-axis and y-axis extensive relative to the z-axis. In certain instances, the thickness dimension along the z-axis may be in a range of 2 to 20 atomic layers. Without wanting to be limited to any particular theory, it is believed that the 2-D extensive catalyst 102 of the catalyst assembly 100 is crystallographically oriented such that the catalytic activities of the 2-D extensive catalyst 102 may be effectively utilized. In certain other instances, and as depicted in FIG. 1C, the bulk-like thin film catalyst 102 may be positioned as a shell supported on and at least partially enclosing a substrate 104 as a core, therefore collectively configured as a core-shell structure.

Figure 2:
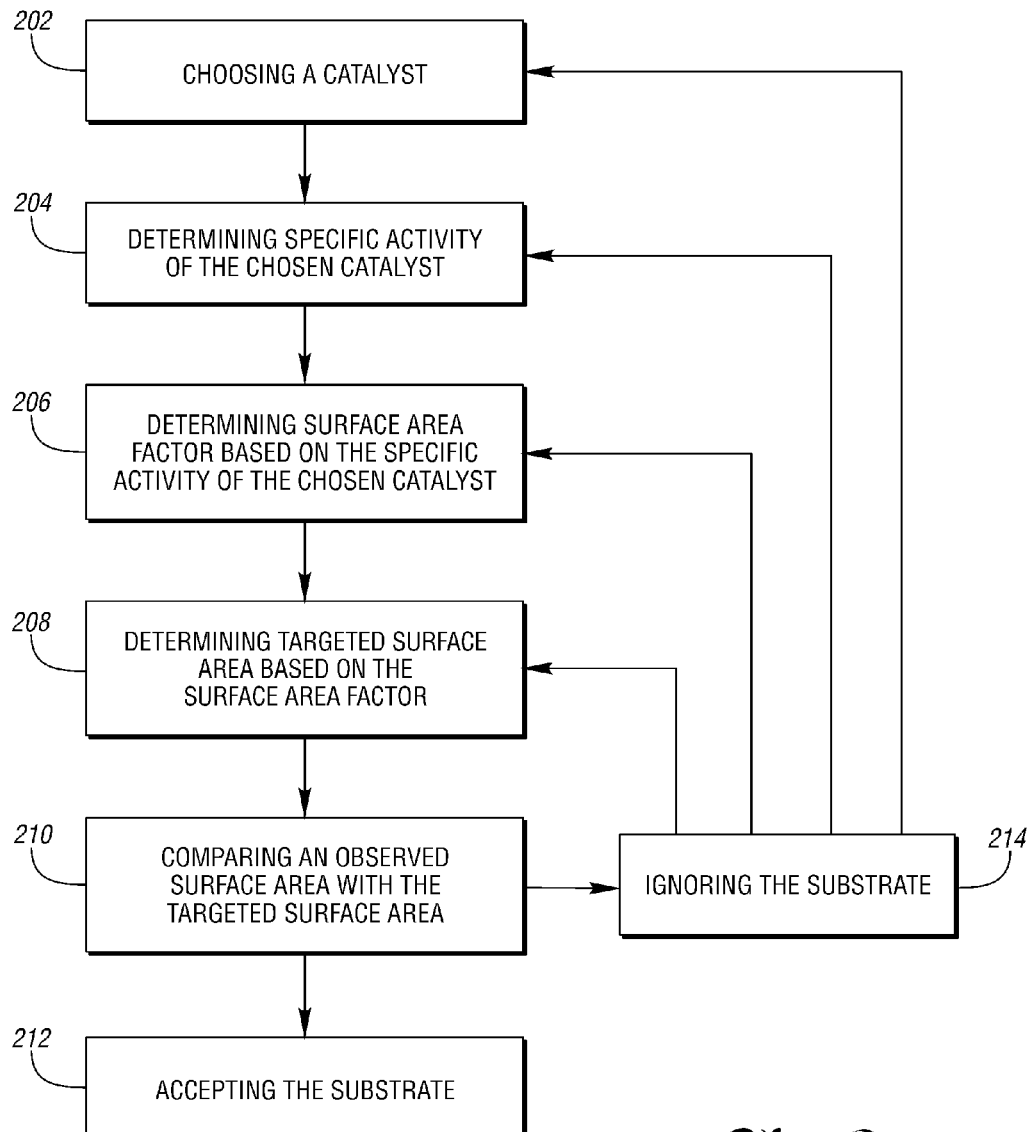
FIG. 2 depicts a flow chart of steps that may be involved in carrying out the present invention in one or more embodiments.

In one aspect of the present invention, a method of selecting a substrate for a given catalyst is provided. In one embodiment, and as depicted in FIG. 2, a method 200 includes the step 206 of determining a surface area factor needed for supporting a bulk-like catalyst having a certain specific activity and pre-selecting a substrate having the surface area factor. In another embodiment, the method 100 may further include one or more of the steps of 202, 204, 206, 208, 210, 212 and 214.

At step 202, a user is presented with a task of searching for a substrate suitable for supporting the given catalyst. Without wanting to be limited to any particular theory, a desirable substrate associated with this task should support the given catalyst with a balanced benefit in material cost and overall electrochemical performance. In certain instances, the given catalyst is a bulk-like catalyst such as catalyst 102 illustratively shown in FIGS. 1A and 1B.

At step 204, the specific activity of the bulk-like catalyst 102 can be determined. Any suitable methods can be employed for the specificity activity measurement. By way of example, a standardized ex-situ catalyst evaluation method can be used to determine the specific activity. The method involves applying the catalyst to the tip of a rotating disk electrode (RDE) in a three electrode (working, counter, reference) electrochemical cell. RDE is performed to establish which catalyst candidate has higher activity for the oxidation reduction reaction (ORR) before advancing to in-situ testing. Cyclic voltammetry (CV) using RDE measurements can determine catalyst electrochemical surface area (ECSA) in an oxygen free environment. CV is also used to determine the catalyst activity in an oxygen environment by measuring the ORR current in a voltage sweep from, for example, 1.03 to 0.05 volts at a sweep rate usually between 5-20 mV/s. ORR currents at 0.9 V (i) can be converted to kinetic currents ($i_k$) using the following equation:

$$i_k = \frac{i * i_D}{i_D - i}$$

In this equation, $i_D$ is the hydrodynamic diffusion limiting current, which is well controlled by setting rotation speed. The kinetic current can then be normalized by ECSA to determine catalyst specific activity. The kinetic current can also be normalized by platinum mass to determine mass activity.

As an alternative to RDE, both specific and mass activities can also be determined by a small single cell fuel cell test (e.g. in 50 cm² hardware) run with fully humidified hydrogen gas on the anode and with fully humidified oxygen gas on the cathode. In this non-limiting approach, the catalyst is integrated into a membrane electrode assembly (MEA) and positioned on the cathode. The cell is held at certain voltage value such as 0.9 V and the resulting current is measured. As with the RDE measurement, the current can be normalized by ECSA or platinum mass to calculate the specific or mass activity respectively.

In certain instances, the bulk-like, thin film catalyst 102 may have a specific activity of at least 1000 µA/cm², or of a range of from 1000 µA/cm² to 2000 µA/cm², 2000 µA/cm² to 3000 µA/cm², 3000 µA/cm² to 4000 µA/cm², 4000 µA/cm² to 5000 µA/cm², or 5000 µA/cm² to 6000 µA/cm².

At step 206, a substrate may be selected based on the surface area factor calculated from the specific activity of the given catalyst according to step 204. The surface area factor is the ratio of required ECSA to planar area.

A non-limiting example of how the surface area factor may be determined is shown in Equation (1), which can be used to determine the surface area factor assuming that a desired mass activity improvement factor and a desired catalyst loading are known.

$$SA_{support}(cm^2_{support}/cm^2_{planar}) = \frac{[\text{"Baseline"}(A/mg_{Pt}) \times \text{Mass Activity } IF \times \text{Catalyst Loading } (mg_{Pt}/cm^2)]}{[\text{Specific Activity } (\mu A/cm^2) \times 0.000001 \ (A/\mu A)]} \quad (1)$$

In Equation (1): the term "Baseline" refers to a conventional catalyst of 5 nm Pt nano-particles dispersed on a carbon black support which has a mass activity of about 100 A per gram of Pt, as determined by either a RDE or in-situ experiment as described herein above. The term "Mass Activity improvement factor (IF)" refers to the activity required to achieve a high current density performance target of 1.5 A/cm² at 0.67 V, at a platinum loading on the cathode of 0.1 mgPt/cm², which may be derived from using a proton exchange membrane fuel cell (PEMFC) model based on computational fluid dynamics (CFD) with the Butler-Volmer equation. In certain particular instances, the improvement factor (IF) as referenced in Equation (1) may be determined via computational fluid dynamics (CFD) modeling.

As can be seen from Equation (1), the surface area factor is reciprocal to the specific activity of the given catalyst. In other words, higher the specific activity of the given catalyst, lower the needed surface area factor, and hence more relaxed a selection window for the candidate substrate.

In certain instances, desirable surface area factor of a substrate for a bulk-like catalyst is of 44 to 60 cm²/cm², 46 to 58 cm²/cm², 48 to 56 cm²/cm², or 50 to 54 cm²/cm². These values may be determined based on the assumptions of 1000 µA/cm² for specific activity and 5.2 times mass activity improvement factor.

Without wanting to be limited to any particular theory, it is believed that a surface area factor of 44 to 60 cm²/cm² would provide cut-off criteria in substrate selecting/screening process as the criteria are believed to represent the most stringent case. This is at least because additional roughness beyond the baseline flat thin film morphology of the bulk-like, thin film catalyst will only contribute with additional surface area, which will in some extent lessen the surface area requirement for the candidate substrates. The required support surface area is therefore reduced. The most aggressive support surface area is for a flat catalyst, where the catalyst is not providing any supplemental surface area, for instance, when the surface area values for the support substrate and the catalyst are substantially equal.

In certain particular instances, the surface area factor is 52 cm²/cm². This value may be obtained through the Equation (1) with the assumptions of 1,000 µA/cm² area specific activity and 5.2 times IF. It is believed the bulk-like catalyst has at least 1,000 µA/cm² and higher specific activity tolerates lower surface area factor. The equation should be general enough to accommodate different stack performance requirements, for instance, via the mass activity IF as well as catalyst loading requirements.

At step 208, one or more assumptions may be made prior to a more practical assessment of a desirable surface area of the candidate substrate. One of the assumptions is an assumption on the parameter of "u"—utilization. The utilization "u" is taken as a ratio or fraction of amount of catalyst electrochemically used based on what is physically present. In particular, a portion of the catalyst present in the catalyst layer may not be spatially or chemically accessible to the reactants. This may occur when, for instance, oxygen molecules are blocked (sterically or otherwise) from catalytic sites, deficiencies in proton conduction to catalytic sites occur due to poor contact with ionomer, or deficiencies in electron conduction to catalytic sites occur due to presence of non-conductive regions where the catalyst layer is discontinuous. In such cases, the catalyst does not contribute to facilitating the oxygen reduction reaction and consequently the catalyst activity. Another assumption can be an assumption on the parameter of "catalyst thickness." The thickness of the catalyst layer (along with the surface area) defines the geometric volume of the requisite support (and catalyst). The thickness of the catalyst layer should ideally remain minimized, preferably to not exceed 10 μm and more preferably <2 μm, to ensure effective and uniform transport of reactant (e.g., protons and oxygen) and product phases throughout the electrode.

Once certain assumptions are made, for instance, assumptions on the utilization fraction and on the catalyst thickness detailed above, a more application-practical surface area assessment of the candidate substrate can be determined based on the surface area factor along with the assumptions. Equation (2) provides a non-limiting example of a function by which the assessment can be made.

$$SA(m^2/g) = \frac{52 \text{ cm}^2/\text{cm}^2_{planar}}{\delta_{CCL} \text{ (cm)}} \times \frac{1}{\rho_{support} \text{ (g/cm}^3)} \times \frac{1 \text{ m}^2}{10000 \text{ cm}^2} \times \frac{1}{u} \quad (2)$$

Here the catalyst layer thickness (δ) can be determined based on microscopy (e.g. scanning electron microscopy) and should preferably be <0.001 cm and more preferably <0.0002 cm; the support bulk density (ρ) can be characterized, for example, based on quantification of the amount of mass of a given material which occupies a fixed volume.

Support bulk density values (ρ) for candidate substrates are readily available from the literature. A non-limiting information source for material bulk density values includes the CRC Handbook of Chemistry and Physics, Perry's Chemical Engineers' Handbook, etc.

As can be seen from Equation (2), the surface area of the substrate in square meters per gram can be calculated as a function of the surface area factor and a density of the candidate substrate.

At step 210, an observed surface area of the substrate is compared to the targeted surface area determined from step 208. If the observed surface area of the substrate is equal to or greater than the targeted surface area determined from step 208, the substrate is selected shown at step 212. If the observed surface area of the substrate is less than the targeted surface area determined from step 208, the substrate is not selected and ignored at step 214. Step 214 may be followed by a repeat of any one of the preceding steps 202, 204, 206, 208, and 210. In certain instances, the step 214 is followed with a repeat of steps 208 and 210.

EXAMPLES

Figure 3:
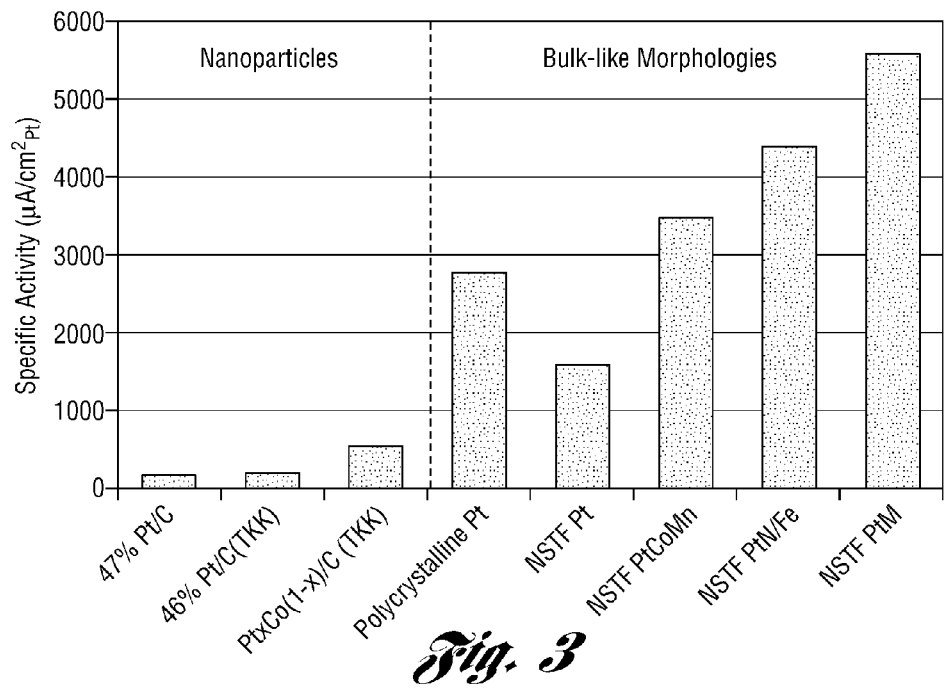
FIG. 3 depicts specific activity values of an assortment of catalyst morphologies.

Various catalyst materials may have vastly different specific activity values. For instance, specific activities for conventional Pt nanoparticles on carbon may range from 100 to 500 μA/cm², whereas bulk-like catalyst morphologies can exhibit beyond an order of magnitude higher. FIG. 3 depicts examples of diverse catalyst-support materials and their observed specific activity values, at least some of which may be obtained from *Applied Catalysis B: Environmental* 56 (2005) 9-35 by Gasteiger et al., and from *Advanced Cathode Catalysts and Supports for PEM Fuel cells*, May 20, 2009, by Mark Debe, entire contents thereof are incorporated herein by reference. Data as depicted in FIG. 3 evidence that specific activities of at least 1000 μA/cm² are characteristic for bulk-like catalyst morphologies. Thus, 1000 μA/cm² is used as a conservative estimate for the targeted specific activity of a given bulk-like, thin film catalyst.

Figure 4:
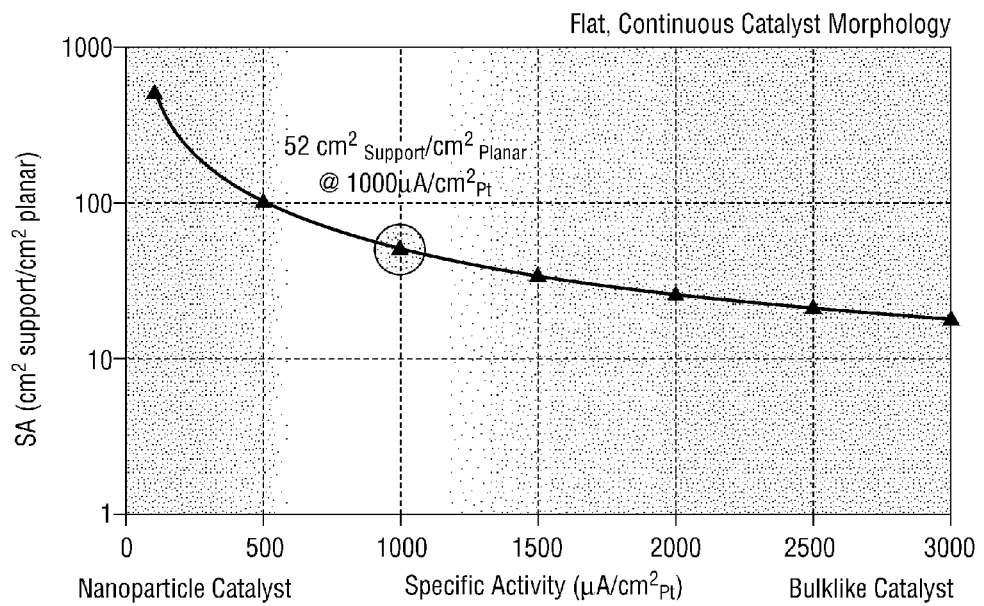
FIG. 4 depicts targeted surface area values as a function of catalyst specific activity values.

FIG. 4 depicts targeted surface area values calculated as a function of specific activity values based on the following parameters: a mass activity IF of being 5.2, a cathode loading of being 0.1 mg Pt/cm², and a baseline mass activity of 0.1 A/mg Pt. These data suggest that a significantly high targeted surface area (i.e., 100-520 cm²$_{Support}$/cm²$_{Planar}$) is required for a low specific activity (i.e., <500 μA/cm²$_{Pt}$) which is characteristic for Pt nanoparticles. Conversely, appreciably lower support surface area (17-52 cm²$_{Support}$/cm²$_{Planar}$) can be adopted for catalysts with higher specific activities (i.e., >1000 μA/cm²$_{Pt}$) that are typical for bulk-like Pt thin film catalyst. A conservative support surface area factor of 52 cm²$_{Support}$/cm²$_{Planar}$ or greater is selected based on a 1000 μA/cm² specific activity representative of bulk-like thin film catalysts.

In this example, a thin cathode catalyst layer with a 1 μm thickness is assumed. Therefore, the total geometric volume available per planar cm² is 0.0001 cm³. The targeted surface area value is also dependent on the bulk density of support which encompasses both particle packing and interior porosity. These bulk density values can be obtained from the literature. Finally, two specific utilization scenarios are considered here: 1) ideal utilization or 100% and 2) about 80% utilization. Table 1 below provides the observed surface area for diverse classes of support materials as compared with the corresponding target surface area based on the above equation. These data suggest that for 100% catalyst utilization, all of the examined support types with the exception of metal (Ni) meshes should be capable of providing the required surface area. For 80% catalyst utilization, only one additional candidate, indium tin oxide, would be excluded. While this list is not meant to be exhaustive, the results illustrate that a wide variety of prominent materials are indeed capable of supplying the necessary surface area for bulk-like catalyst having flat catalyst morphology. These examples also highlight the methodology used for filtering potential supports based on surface area values.

In this example, at assumed condition of a current of 1.5 A/cm² at 0.67V and a gas inlet pressure of 1.5 bar absolute, a PEMFC model based on CFD with Butler-Volmer equation suggests a 13x improvement relative to the conventional Pt nanoparticles on carbon. This volumetric IF corresponds to a 5.2xIF on a mass activity basis, assuming a 10x thinner catalyst layer, 4x lower Pt loading, and a baseline performance of 0.1 A/mg$_{Pt}$ for Pt nanoparticles on carbon.

Table 1 tabulates evaluation of observed surface areas "SA Observed" based on literature data for various substrate materials as compared to the targeted surface areas "SA Targeted" based on the surface area factor of 52 cm²/cm². The surface area targets for two different area specific utilization (u) values are provided. Abbreviations used in Table 1: "SWNT" stands for single-walled nanotube; "MWNT" stands for multi-walled nanotube; and "ZIF" stands for zeolitic imidizolate framework.

TABLE 1

| Substrate Type | Density (g/cm³) | SA Observed (m²/g) | SA Targeted (m²/g) [u = 100%, MAIF = 5.2x] | SA Targeted (m²/g) [u = 80%, MAIF = 5.2x] |
|---|---|---|---|---|
| SWNT Carbon | 1.8 | 400 to 900 | 43 | 54 |
| MWNT Carbon | 2.1 | 200 to 400 | 37 | 46 |
| Activated Carbon | 0.5 | 250 | 156 | 195 |
| Carbon Aerogel | 0.4 | 500 to 1000 | 181 | 227 |
| Tungsten Oxide (WO$_x$) | 7.2 | 10 to 80 | 11 | 14 |
| Indium Tin Oxide (ITO) | 1.2 | 20 to 80 | 65 | [[81]] |
| Titanium Oxide (TiO$_x$) | 4.3 | 50 to 150 | 18 | 23 |
| Tungsten Carbide | 4.5 | 10 to 40 | 17 | 22 |
| ZIF-8 | 0.9 | 1300 to 1800 | 84 | 106 |
| Ni Mesh (1500 mesh, 5.6 μm in diameter) | 5.0 | 0.06 | [[16]] | [[20]] |
| Ni Mesh (300 mesh, 18.9 μm in diameter) | 3.5 | 0.02 | [[22]] | [[28]] |

As can be seen from Table 1, tungsten oxide has an observed surface area of 10 to 80 m²/g surface area and it can meet the targeted substrate surface area of 11 m²/g at 100% utilization and 14 m²/g at 80% utilization. Therefore this substrate material is suitable for supporting a bulk-like catalyst. For the same token of reasoning, indium tin oxide is a suitable substrate for the bulk-like catalyst. In the meantime, Ni mesh in both 1500 mesh and 300 mesh dimensions are not suitable substrates for supporting a bulk-like, thin film catalyst, wherein the observed surface area values of 0.06 or 0.02 are way lower than the targeted surface area values of 16 and 22 for 100% utilization and of 20 and 28 for 80% utilization. In these scenarios, the targeted values expressed in double square brackets indicate that the corresponding materials are not suitable as a supporting substrate for a bulk-like catalyst. The materials in Table 1 have all been examined as catalyst supports predominantly for nanoparticle-based catalysts. The benefit of this invention in one or more embodiments is that it provides a rational method for screenings supports for bulk-like, thin film catalysts.

In one or more embodiments, the present invention is advantageous in providing a method of selecting or alternatively screening a broad range of candidate substrates for a given catalyst. This potentiates, at least theoretically, the employment of a substrate to optimize the catalytic activity and/or durability of a given catalyst. In this regard, the selection window for the candidate substrates can be widened and the use of bulk-like catalysts is effectively potentiated.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. A method comprising:
   determining SA$_{support}$ (surface area factor) of a catalyst having a specific activity and loading via:

$$SA_{support}(cm^2_{support}/cm^2_{planar}) = \frac{[\text{"Baseline"}(A/mg_{Pt}) \times \text{Mass Activity } IF \times \text{Loading } (mg_{Pt}/cm^2)]}{[\text{Specific Activity } (\mu A/cm^2) \times 0.000001 \ (A/\mu A)]},$$

Baseline is mass activity of 100 A/g platinum for 5 nm platinum nanoparticles dispersed on a carbon black support, and MassActivityIF is activity required to achieve 1.5 A/cm² current density performance at 0.67 V, at a platinum loading of 0.1 mgPt/cm²;
   selecting a substrate based on SA$_{support}$; and
   depositing the catalyst on the substrate.

2. The method of claim 1, further comprising calculating a targeted surface area based on SA$_{support}$.

3. The method of claim 2, wherein the calculating step further includes calculating the targeted surface area as a positive function of SA$_{support}$.

4. The method of claim 3, wherein the calculating step further includes calculating the targeted surface area as a function of SA$_{support}$ and at least one of three parameters: a material density of the substrate, a thickness of the catalyst, and a catalyst utilization rate.

5. The method of claim 2, wherein the calculating step includes calculating the targeted surface area from SA$_{support}$ according to equation:

$$SA(m^2/g) = \frac{52 \ cm^2/cm^2_{planar}}{\delta_{CCL} \ (cm)} \times \frac{1}{\rho_{support} \ (g/cm^3)} \times \frac{1 \ m^2}{10000 \ cm^2} \times \frac{1}{u}$$

wherein $\delta_{CCL}$ is catalyst layer thickness, $\rho_{support}$ is substrate bulk density, and u is catalyst utilization fraction.

6. The method of claim 2, further comprising selecting the substrate if the targeted surface area is no greater than an observed surface area of the substrate.

7. The method of claim 2, further comprising:
   repeating one or more of the steps of determining, selecting and calculating if the targeted surface area of the substrate is greater than an observed surface area of the substrate.

8. The method of claim 1, wherein the step of determining includes determining SA$_{support}$ as a function of the specific activity of the catalyst, the catalyst being two-dimensional extensive.

9. The method of claim 1, wherein the step of selecting includes selecting a candidate substrate that is two-dimensional extensive.

10. The method of claim 1, wherein SA$_{support}$ is 44 to 60 cm²/cm².

11. The method of claim 1, wherein SA$_{support}$ is 50 to 54 cm²/cm².

12. A method of forming a catalyst/substrate construction, comprising:
   identifying a two-dimensional (2-D) extensive catalyst;
   determining a surface area factor for supporting the 2-D extensive catalyst according to equation $$SA_{support}(cm^2_{support}/cm^2_{planar}) = \frac{[\text{"Baseline"}(A/mg_{Pt}) \times \text{Mass Activity } IF \times \text{Loading } (mg_{Pt}/cm^2)]}{[\text{Specific Activity } (\mu A/cm^2) \times 0.000001 \, (A/\mu A)]};$$

selecting a substrate having the surface area factor within a surface area factor range, wherein the term "Baseline" refers to mass activity of 100 A per gram of platinum (Pt) for a comparative catalyst 5 nm Pt nano-particles dispersed on a carbon black support, the term "Mass Activity IF" refers to the activity required to achieve a high current density performance target of 1.5 A/cm² at 0.67 V, at a platinum loading of 0.1 mg Pt/cm²; and
   applying the substrate to the 2-D extensive catalyst to form the catalyst/substrate construction.

13. The method of claim 12, further comprising calculating a targeted surface area according to equation $$SA(m^2/g) = \frac{52 \, cm^2/cm^2_{planar}}{\delta_{CCL} \, (cm)} \times \frac{1}{\rho_{support} \, (g/cm^3)} \times \frac{1 \, m^2}{10000 \, cm^2} \times \frac{1}{u}$$

wherein $\delta_{CCL}$ stands for catalyst layer thickness, $\rho_{support}$ stands for substrate bulk density, u stands for catalyst utilization fraction.

14. The method of claim 13, further comprising selecting the substrate if the targeted surface area is no greater than an observed surface area of the substrate.

15. The method of claim 13, further comprising:
   repeating one or more of the steps of determining, selecting and calculating if the targeted surface area of the substrate is greater than an observed surface area of the substrate.

16. The method of claim 12, wherein the surface area factor range is 44 to 60 cm²/cm².

17. The method of claim 12, wherein the surface area factor range is 50 to 54 cm²/cm².

18. A method of forming a catalyst/substrate construction, comprising:
   identifying a two-dimensional (2-D) extensive catalyst;
   determining a surface area factor needed for supporting a two-dimensional (2-D) extensive catalyst according to equation (1)

$$SA_{support}(cm^2_{support}/cm^2_{planar}) = \frac{[\text{"Baseline"}(A/mg_{Pt}) \times \text{Mass Activity } IF \times \text{Loading } (mg_{Pt}/cm^2)]}{[\text{Specific Activity } (\mu A/cm^2) \times 0.000001 \, (A/\mu A)]} \quad (1)$$

wherein the term "Baseline" refers to mass activity of 100 A per gram of platinum (Pt) for a comparative catalyst 5 nm Pt nano-particles dispersed on a carbon black support, the term "Mass Activity IF" refers to the activity required to achieve a high current density performance target of 1.5 A/cm² at 0.67 V, at a platinum loading of 0.1 mg Pt/cm²;
   selecting a substrate having the surface area factor within a surface area factor range;
   calculating a targeted surface area according to equation (2)

$$SA(m^2/g) = \frac{52 \, cm^2/cm^2_{planar}}{\delta_{CCL} \, (cm)} \times \frac{1}{\rho_{support} \, (g/cm^3)} \times \frac{1 \, m^2}{10000 \, cm^2} \times \frac{1}{u} \quad (2)$$

wherein $\delta_{CCL}$ stands for catalyst layer thickness, $\rho_{support}$ stands for substrate bulk density, u stands for catalyst utilization fraction; and
   applying the substrate to the 2-D extensive catalyst to from the catalyst/substrate construction.

* * * * *